(12) United States Patent  (10) Patent No.: US 8,014,031 B2
Ozawa  (45) Date of Patent: Sep. 6, 2011

(54) FORMATION OF PICTURE IMAGE HAVING GRADATION EXPRESSED BY FILL AREA AND ONE-LINE IMAGE DATA

(75) Inventor: Shuuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 12/254,104

(22) Filed: Oct. 20, 2008

(65) Prior Publication Data

US 2009/0103139 A1  Apr. 23, 2009

(30) Foreign Application Priority Data

Oct. 23, 2007  (JP) .................................. 2007-275477

(51) Int. Cl.
*G06K 15/00*  (2006.01)
(52) U.S. Cl. ......... 358/2.1; 358/3.1; 358/1.15; 358/518; 358/1.9; 382/232
(58) Field of Classification Search .................... 358/2.1, 358/3.1, 1.15, 518; 382/232
See application file for complete search history.

(56) References Cited

U.S. PATENT DOCUMENTS

2007/0127826 A1* 6/2007 Kishi ............................ 382/232
2007/0291313 A1* 12/2007 Kadota .......................... 358/3.1

FOREIGN PATENT DOCUMENTS

JP  2003-050683  2/2003

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

A gradation conversion process section converts gradation made up of a plurality of filled regions and filling colors thereof into one-line image data of a filled region into which the plurality of filled regions is unified. A data transmitting process section transmits the one-line image data to a data reception process section. The received one-line image data is interpreted by a PDL interpretation process section, and converted into data which can be interpreted by a rendering process section, and the data is saved on a display list. The rendering process section converts the saved data into gradation made up of a plurality of filled regions and filling colors thereof, and renders the gradation.

8 Claims, 11 Drawing Sheets

FORMATION OF PICTURE IMAGE HAVING GRADATION EXPRESSED BY FILL AREA AND ONE-LINE IMAGE DATA

BACKGROUND OF THE INVENTION

1. Field of the Invention

The present invention relates to image formation processing, more specifically, it relates to high rate image formation processing of a gradation expressed by a filled region and one-line image data thereof.

2. Description of the Related Art

There is processing for forming an image from an electronic document and PDL data made up of a plurality of image objects (for example, a character object, an image object, and a graphic object).

An expressing effect where a color or density of an image is changed stepwise is referred to as a gradation.

As a method for expressing a gradation using image objects, there is the one for specifying a plurality of objects with a filled region and a filling color specified.

The method expresses a gradation by causing filled regions to neighbor each other and by changing the filling color thereof stepwise.

The method has a problem in that the number of objects increases and data sizes of an electronic document or PDL data increases.

In order to solve the problem, there is processing for converting object groups expressing a gradation in a vertical or horizontal direction into one-line image data.

On the other hand, it is possible to unify a plurality of filled regions into one filled region (Japanese Patent Laid-Open No. 2003-050683).

By filling the unified filled region while (repeatedly) subjecting one-line image data to expansion processing longitudinally or transversely, expression similar to the gradation expression using a plurality of objects is achieved.

FIG. 1 illustrates an example of forming an image while transversely subjecting one-line image data to expansion processing and to halftone processing.

From one-line image data 101, one pixel of data is obtained by means of expansion processing 102.

The obtained one pixel of data is halftoned by means of halftone processing 103, and written on a memory 104 where an image is formed.

The above-mentioned processing is performed on all pixels in the filled region.

Performing expansion processing and halftone processing as mentioned above on the unified filled region for each pixel will take a very long time for image formation.

In a prior art, it is possible to make data size of an electronic document or PDL data small by expressing a gradation with a filled region and one-line image data thereof, however, as mentioned above, there has been a problem in that it has taken a very long time for image formation.

SUMMARY OF THE INVENTION

In order to solve the problem, the present invention provides an image forming system including a host device and an image forming device which receives image data from the host device to form an image, wherein the host device includes: conversion means for converting a gradation made up of a plurality of filled regions and filling colors of the areas into one-line image data of a filled region into which the plurality of filled regions is unified; and transmission means for transmitting the one-line image data to the image forming device; and wherein the image forming device includes: rendering means; receiving means for receiving the one-line image data from the host device; and means for interpreting the received image data to convert the interpreted data into data that can be interpreted by the rendering means to save the converted data; wherein the rendering means converts the saved converted data into the gradation made up of the plurality of filled regions and filling colors of the areas to render the converted gradation.

Here, the rendering means may include means for generating rectangular tile data having a constant size, which is halftoned corresponding to the filling colors for each pixel for the plurality of filled regions, and means for applying the generated tile data to the filled regions.

Another aspect of the present invention provides an image forming method in an image forming system having a host device and an image forming device that receives image data from the host device to form an image: the method comprising the steps of: in the host device converting a gradation made up of a plurality of filled regions and filling colors of the areas into one-line image data of a filled region into which the plurality of filled regions is unified; and transmitting the one-line image data to the image forming device; in the image forming device receiving the one-line image data from the host device; and interpreting the received image data to convert the interpreted data into data that can be interpreted by rendering means to save the converted data; and by the rendering means, converting the saved converted data into the gradation made up of the plurality of filled regions and filling colors of the areas and to render the converted gradation.

Here, in the step of rendering, rectangular tile data having a constant size, which is halftoned, which is halftoned for each pixel for the plurality of filled regions can be generated corresponding to the filling colors, and the generated tile data can be applied to the filled regions.

Another aspect of the present invention provides a host device which includes: conversion means for converting a gradation made up of a plurality of filled regions and filling colors of the areas into one-line image data of a filled region into which the plurality of filled regions is unified; and transmission means for transmitting the image data to an image forming device.

Another aspect of the present invention provides an image forming device which includes: rendering means; means for receiving one-line image data of a unified filled region, which is obtained by converting a gradation made up of a plurality of filled regions and filling colors of the areas; and means for interpreting the received image data to convert the interpreted data into data that can be interpreted by the rendering means to save the converted data; wherein, the rendering means converts the saved converted data into the gradation made up of the plurality of filled regions and filling colors of the areas to render the converted gradation.

Here, the rendering means may include: means for generating rectangular tile data having a constant size, which is halftoned corresponding to the filling colors for each pixel for the plurality of filled regions; and means for applying the generated tile data to the filled regions.

Another aspect of the present invention provides a storage medium which stores instructions capable of being read by a processing device, the instructions causing the processing device to function as: rendering means; means for receiving one-line image data of unified filled region, which is obtained by converting a gradation made up of a plurality of filled regions and filling colors of the areas, the unified filled region being formed by uniting the plurality of filled regions; and means for interpreting the received image data to convert the interpreted data into data that can be interpreted by the rendering means to save the converted data; wherein the rendering means converts the saved converted data into the gradation made up of the plurality of filled regions and filling colors of the areas to render the converted gradation.

According to the present invention, it is possible to execute formation of an image having gradation expressed by a filled region and one-line image data thereof at a high rate.

Moreover, since an electronic document and PDL data can be held by a filled region and one-line image data thereof, the data size thereof becomes small.

Further features of the present invention will become apparent from the following description of exemplary embodiments (with reference to the attached drawings).

DESCRIPTION OF THE EMBODIMENTS

First Embodiment

In the present embodiment, an example will be described, where a user generates an electronic document including a gradation expression with application software on a host computer or a host device, and transmits the electronic document to an image forming device to print the document.

Figure 1:
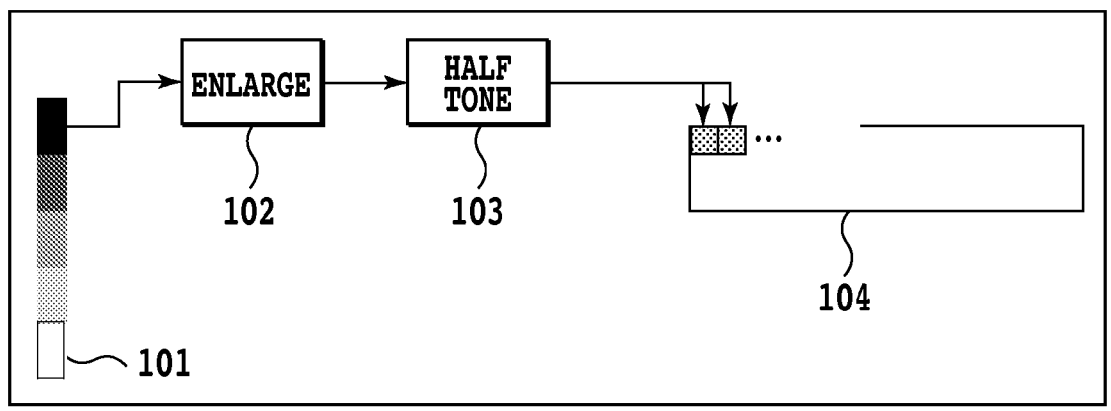
FIG. 1 is a view illustrating how a gradation is expressed by a plurality of filled regions and filling colors.
Figure 2:
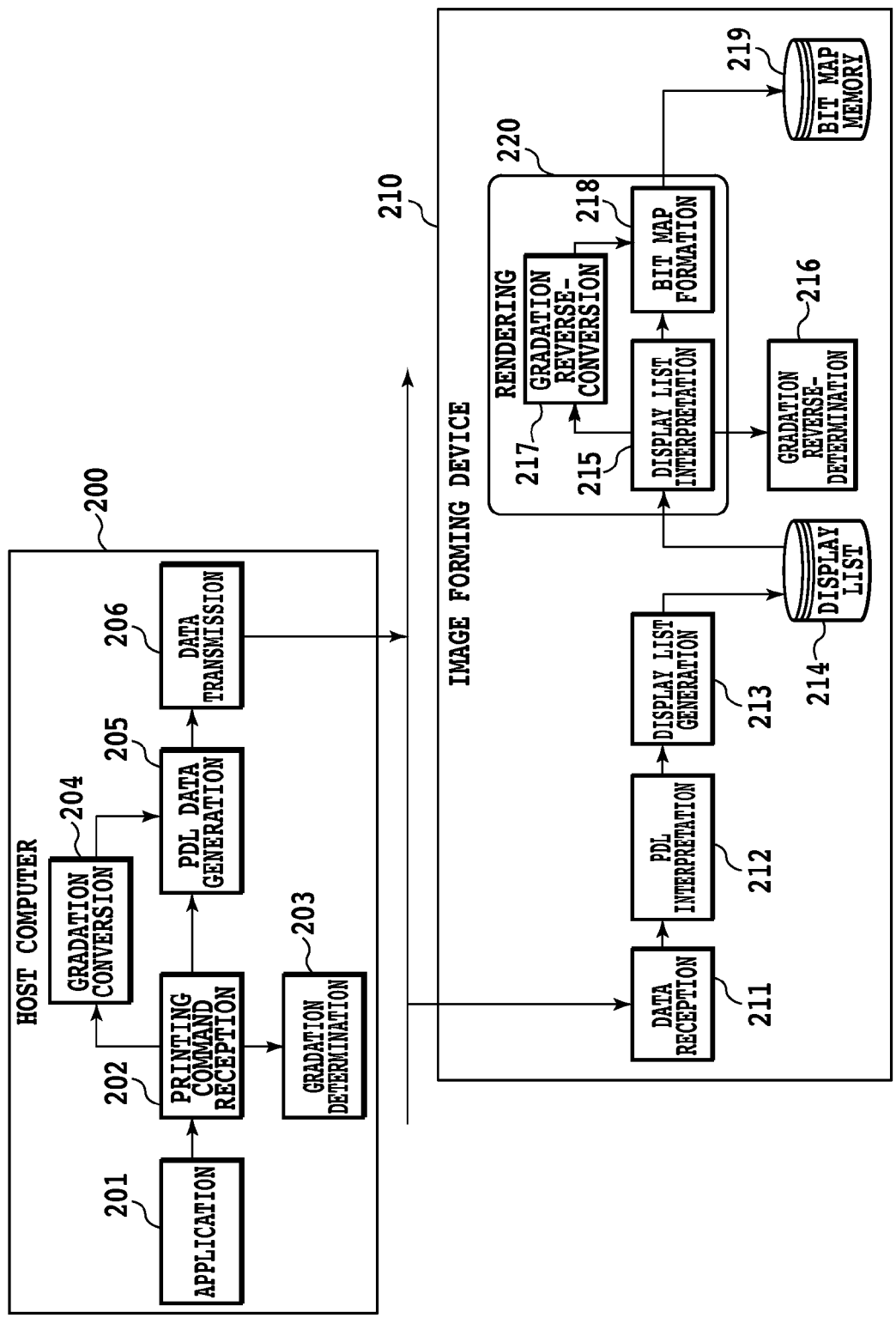
FIG. 2 is a block diagram illustrating a flow of whole of processing in an image forming system according to a first embodiment.

FIG. 2 is a block diagram illustrating the flow of whole processing in an image forming system according to the present embodiment.

Using application software 201 on a host computer 200, a user generates an electronic document including a gradation expression.

The gradation expression by the application software 201 is based on a method for specifying a plurality of filled regions and filling colors thereof.

If the user performs printing of the electronic document using the application software 201, electronic data including the gradation expression will be transmitted to a printing command receiving section 202.

The printing command receiving section 202 calls a gradation determination process section 203 for determining whether a gradation expressed by a method for specifying a plurality of filled regions and filling colors thereof is present among the transmitted electronic document.

If determined that a gradation expressed by the method for specifying a plurality of filled regions and filling colors thereof is present, the gradation determination process section 203 returns which data expresses the gradation to the printing command receiving section 202.

The printing command receiving section 202 passes data constituting the gradation expression expressed by the method for specifying a plurality of filled regions and filling colors thereof to a gradation conversion process section 204.

Moreover, the printing command receiving section 202 passes data other than the data constituting the gradation expression expressed by the method for specifying a plurality of filled regions and filling colors thereof to a PDL data generating process section 205. The PDL data generating process section 205 converts the data into PDL data which can be interpreted by an image forming device 210.

For the gradation expressed by the method for specifying a plurality of filled regions and filling colors thereof, the gradation conversion process section 204 unifies the plurality of filled regions into one filled region, and generates one-line image data where the plurality of filling colors are unified. The gradation conversion process section 204 passes the converted filled region and one-line image data thereof to the PDL data generating process section 205.

The PDL data generating process section 205 converts the data of a unified filled region and one-line image thereof into PDL data which can be interpreted by the image forming device 210. The PDL data generating process section 205 passes the converted PDL data to the data transmitting process section 206.

In addition, in the electronic data generated by the application software 201, a plurality of gradation expressions may be included, and, in the case, a plurality of unified filled regions and one-line image data thereof are generated in the PDL data.

The data transmitting process section 206 transfers the PDL data to the image forming device 210 by a data transfer method (connection using a network, Centronics or USB). Since, in the transfer, a gradation expression is expressed by a filled region and one-line image data thereof, the size of the PDL data to be transferred can be made small, enabling transfer processing to be performed more efficiently at a higher rate.

The PDL data transferred from the host computer 200 by the data transmitting process section 206 is received by a data reception process section 211 of the image forming device 210. The data reception process section 211 passes the received PDL data to a PDL interpretation process section 212. The PDL interpretation process section 212 interprets the PDL data, and passes the information thereof to a display list generating process section 213.

When a gradation is expressed by specifying a plurality of filled regions and filling colors thereof, if conversion processing by the gradation conversion process section 204 is not performed, it will take long time for interpretation processing of the PDL data by the PDL interpretation process section 212. This is because the PDL interpretation process section 212 is required to interpret a plurality of PDL data for one gradation expression. However, since, according to the present embodiment where conversion processing is performed by the gradation conversion process section 204, a gradation can be expressed by one unified filled region and one-line image data thereof, processing by the PDL interpretation process section 212 can be performed in a short time.

The display list generating process section 213 converts the format of the data interpreted by the PDL interpretation process section 212 into a data format which can be interpreted by a rendering process section 220, and saves the data as a display list 214.

The rendering process section 220 includes a display list interpretation process section 215, a gradation reverse-determination process section 216, a gradation reverse-conversion process section 217, and a bit map formatting process section 218.

The display list 214 generated and saved by the display list generating process section 213 is interpreted by the display list interpretation process section 215.

The display list interpretation process section 215 interprets the display list 214, and, in order to determine whether data expressing a gradation by a unified filled region and one-line image thereof is included, calls a gradation reverse-determination process section 216.

When determined that a gradation expressed by a unified filled region and one-line image data thereof is present, the gradation reverse-determination process section 216 returns which data expresses the gradation to the display list interpretation process section 215.

The display list interpretation process section 215 passes the data constituting the gradation expressed by a unified filled region and one-line image data thereof to the gradation reverse-conversion process section 217. On the other hand, data other than the data constituting the gradation expressed by a unified filled region and one-line image data thereof is passed to the bit map formatting process section 218. Using the data, the bit map formatting process section 218 forms an image on a bit map memory 219.

The gradation reverse-conversion process section 217 reversely converts the gradation expressed by a unified filled region and one-line image thereof data from the display list interpretation process section 215 into a gradation expression expressed by the method for specifying a plurality of filled regions and filling colors thereof. The gradation expression obtained by reverse-conversion is passed to the bit map formatting process section 218. The bit map formatting process section 218 forms an image on the bit map memory 219, having the gradation obtained by reverse-conversion and expressed by the method for specifying a plurality of filled regions and filling colors thereof.

By performing such processing according to the present embodiment, PDL data in intermediate processing can be dealt with at a state of small data size and by small processing, and further, processing at the time of developing the data into a bit map can also be performed at a high rate.

Here, the bit map indicates a memory such as a memory of a page or a memory of a band, having 1 bit, 2 bits or 4 bits of CMYK as a pixel format.

Figure 3:
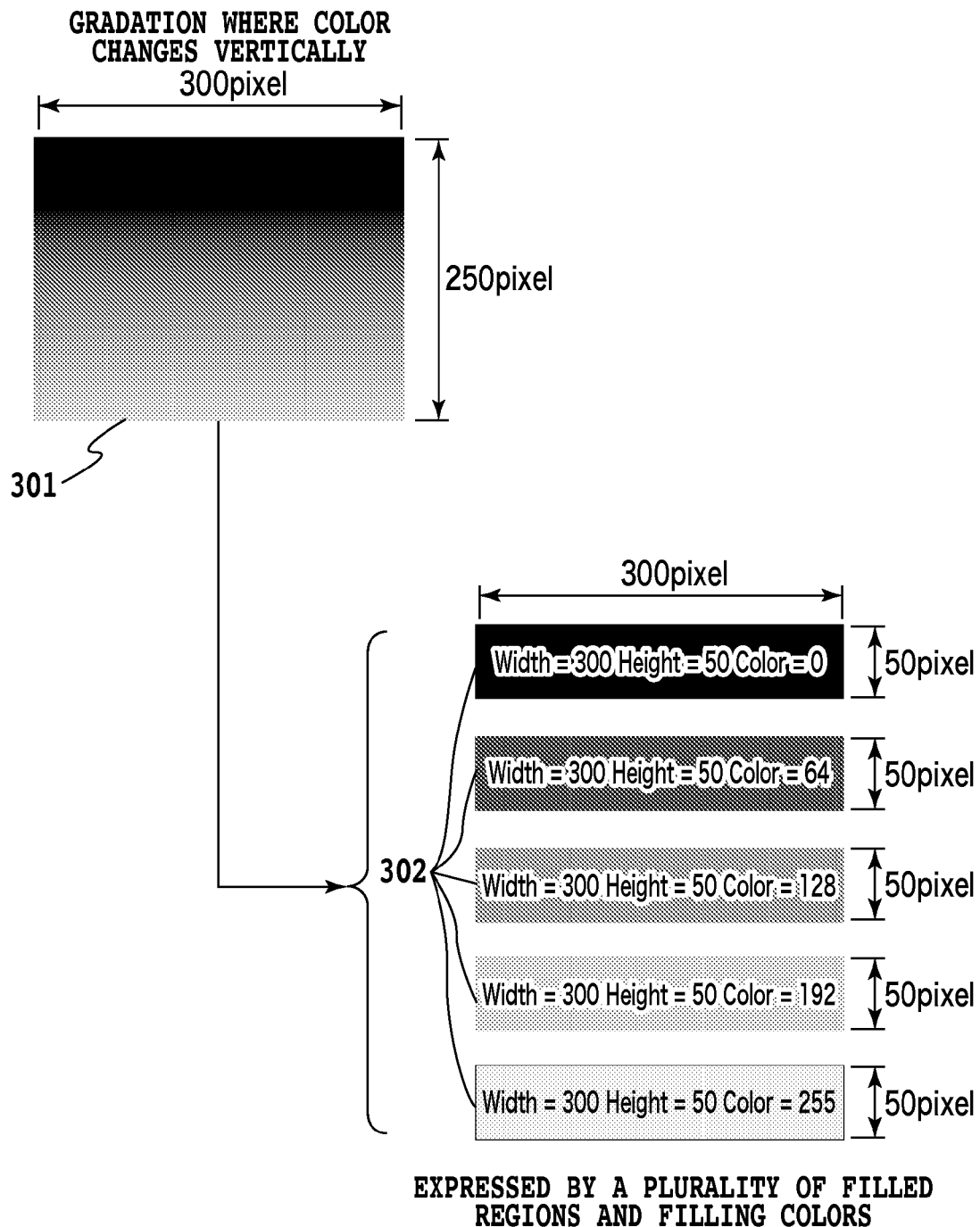
FIG. 3 is a view illustrating an example of the first embodiment where a gradation is expressed by a method for specifying a plurality of filled regions and filling colors thereof.

With reference to FIG. 3, an example will be described, where a gradation is expressed by the method for specifying a plurality of filled regions and filling colors thereof.

The image formation result for a gradation expression where a color changes in a vertical direction is indicated by reference numeral 301. When the gradation is expressed by the method for specifying a plurality of filled regions and filling colors thereof, the image formation result 301 for the gradation expression includes a plurality of objects 302.

For the gradation expression where a color changes in a vertical direction, the plurality of objects 302 are made up of a plurality of filled regions that is a plurality of rectangular areas divided in a height direction.

Since, for the gradation of the image formation result 301, brightness becomes gradually higher from the top to the bottom of the image in FIG. 3, for each rectangular area of the plurality of objects 302, as a filled region to be rendered becomes lower in FIG. 3, the filling color with higher brightness is specified.

Figure 4:
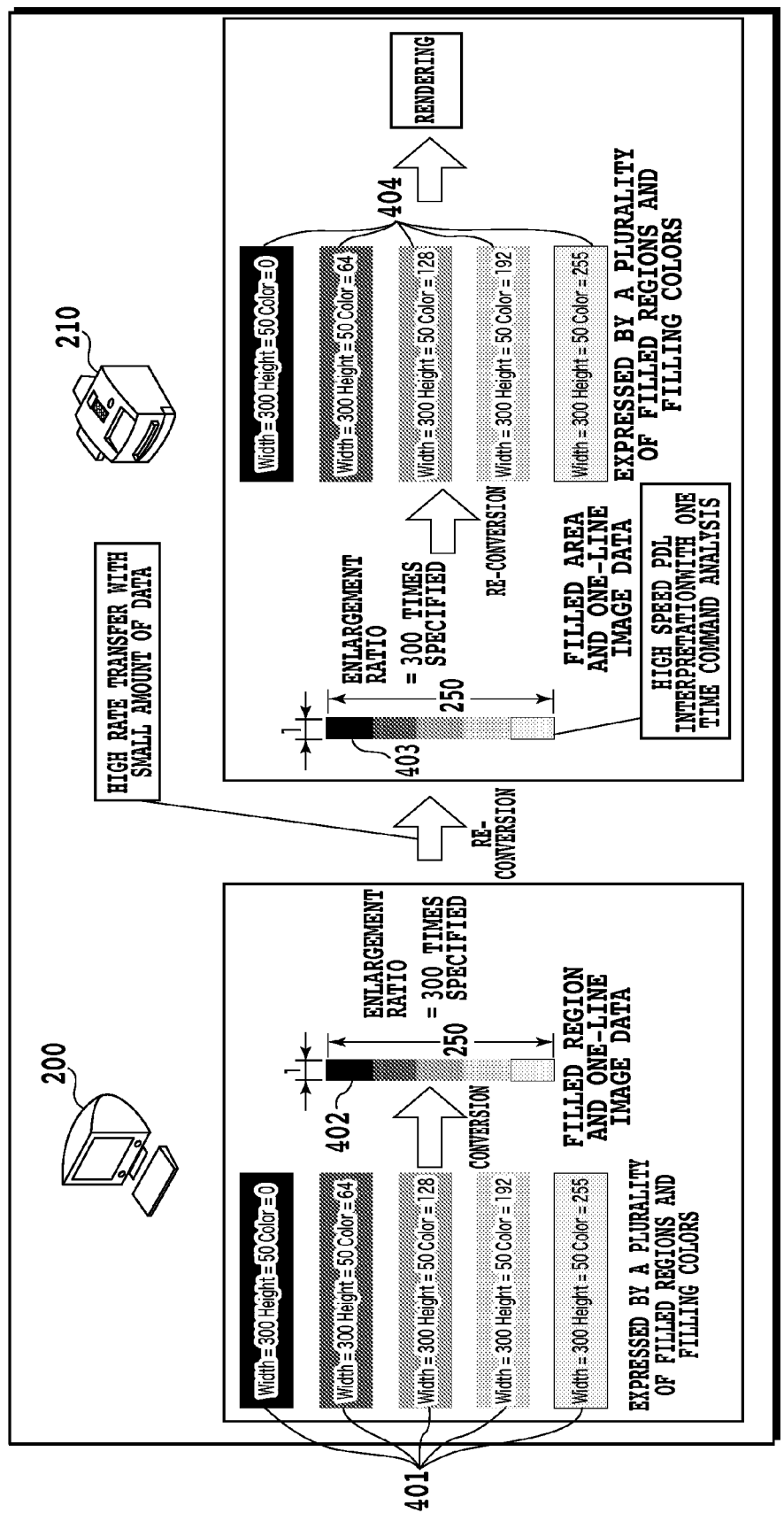
FIG. 4 is an outline view of the first embodiment, illustrating how a higher processing rate is achieved in each processing.
Figure 5:
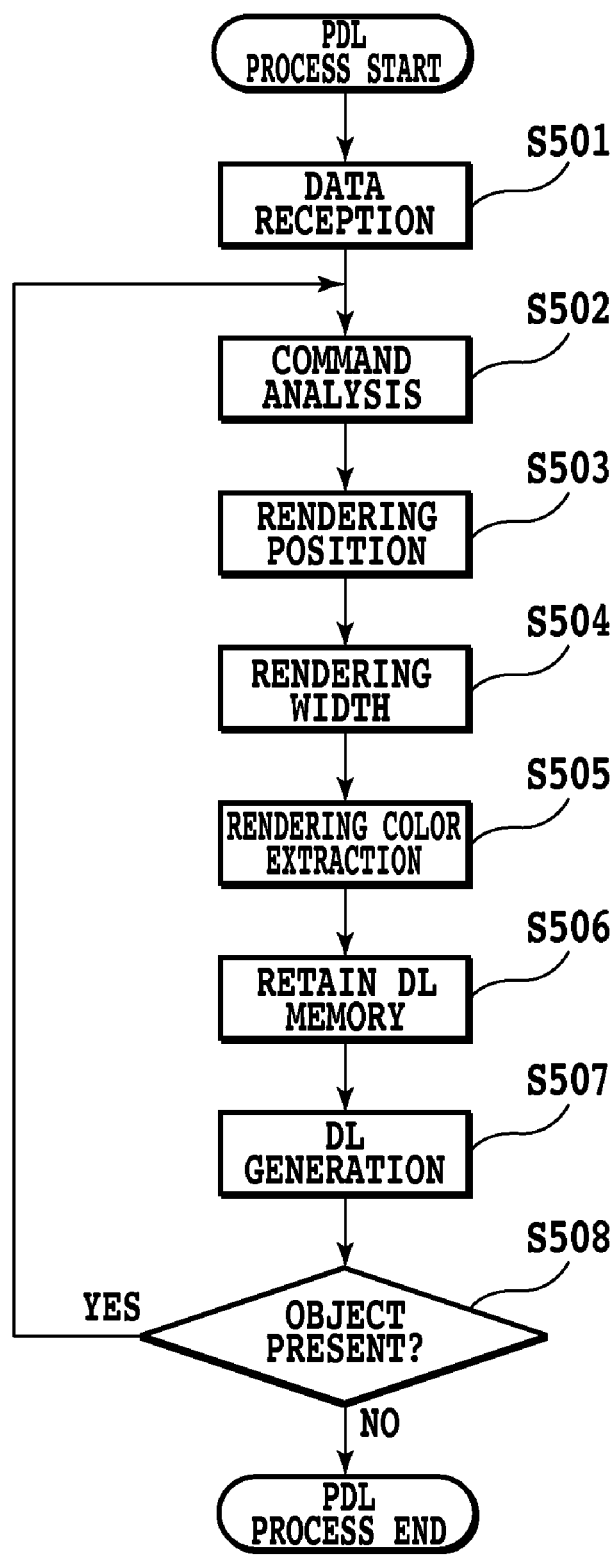
FIG. 5 is a view of the first embodiment, illustrating how an image forming device performs processing of a gradation expressed by the method for specifying a plurality of filled regions and filling colors thereof.
Figure 6:
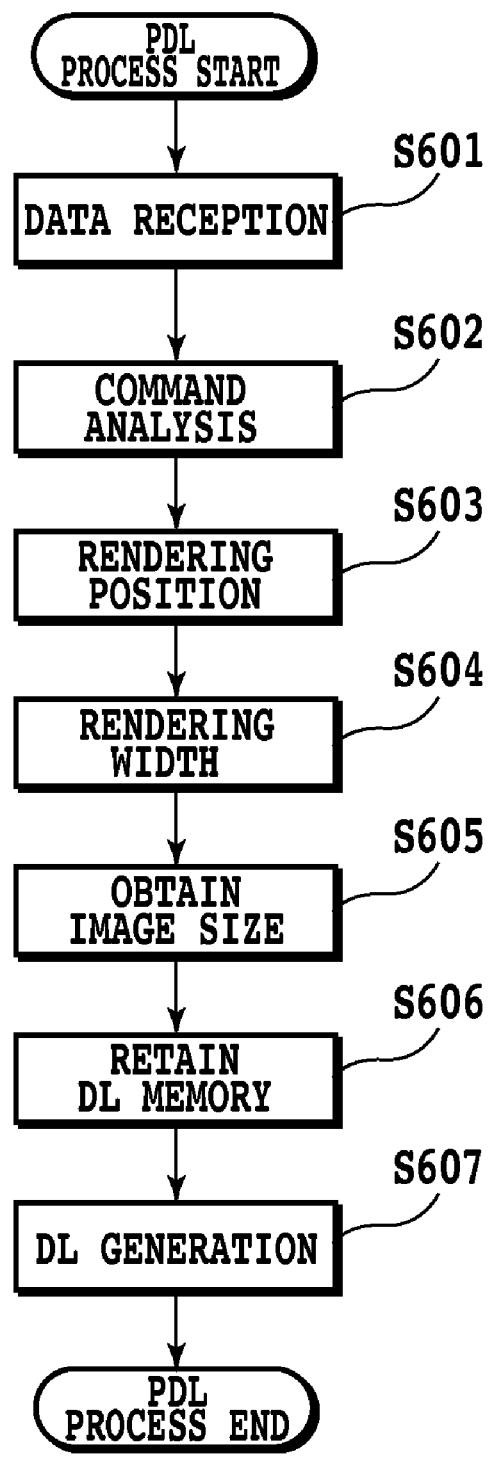
FIG. 6 is a view of the first embodiment, illustrating how the image forming device performs processing of a gradation expressed by a filled region and one-line image data thereof.

With reference to FIG. 4 to FIG. 6, the advantage of processing according to the present embodiment will be described, where a gradation expressed by the method for specifying a plurality of filled regions and filling colors thereof is converted into a gradation expressed by a unified filled region and one-line image data thereof.

On a host computer 200, a gradation expressed by the method for specifying a plurality of filled regions 401 and filling colors thereof is converted into a gradation 402 expressed by a unified filled region and one-line image data thereof (FIG. 4). By the conversion, objects including a gradation can be unified to one. It is possible to specify an enlargement ratio to the gradation 402 obtained by conversion, and to transfer it to the image forming device 210.

By performing such processing, the size of data transferred from the host computer 200 to the image forming device 210 can be made small, enabling an improved transfer rate to be achieved.

In addition, although the plurality of filled regions 401 is expressed by five rectangular objects, it is not limited for the present embodiment that the gradation expressed by the method for specifying a plurality of filled regions and filling colors thereof is constituted by five objects. In order to render a beautiful gradation practically, it is necessary to divide the gradation into much more objects, and the data size in the case will be larger.

In the image forming device 210, the data interpretation for a gradation expression 403 expressed by a unified filled region and one-line image data thereof is performed, which is transmitted as PDL data from the host computer 200. The interpretation processing can also be performed at a higher rate because of one object configuration. In the image forming device 210, after the data interpretation, the gradation expression 403 is reversely converted into a gradation expressed by the method for specifying a plurality of filled regions and filling colors thereof to be rendered.

While comparing the flow of processing according to the present embodiment illustrated in FIG. 6 to the flow of usual processing illustrated in FIG. 5, the detail of processing by the image forming device will be described.

FIG. 5 is a flow chart illustrating the flow where the gradation expressed by the method for specifying a plurality of filled regions and filling colors thereof is processed by the image forming device as usual.

The data reception process section 211 performs a process at Step S501, the PDL interpretation process section 212 performs processes at Steps S502 to S505 and S508, and the display list generating process section 213 performs processes at Steps S506 and S507.

The data reception process section 211 receives PDL data and passes it to the PDL interpretation process section 212 (S501). The PDL interpretation process section 212 interprets the PDL data (S502); extracts rendering positions (S503), rendering widths (S504), and filling colors that are rendering colors (S505); and passes them to the display list generating process section 213.

The display list generating process section 213 retains a memory for display list generation (S506), and generates a display list based on the information passed from the PDL interpretation process section 212 (S507).

At this point, processing from the PDL interpretation of an object with one filled region and one filling color to the display list generation is completed.

Since a gradation is constituted by a plurality of filled regions and filling colors, the PDL interpretation process section 212 performs determination at Step S508, and performs processing of the next filled region and the filling color thereof, sequentially.

In other words, the image forming device 210 repeats process of Steps S502 to S507 until it finishes processing for all filled regions and filling colors thereof constituting a gradation.

Thus, when conversion processing according to the present embodiment is not performed at the side of the host computer 200, and a gradation is expressed by a plurality of objects, repeatedly processing which loops every command analysis is required. Therefore, it takes a long time for the PDL interpretation processing and the display list generation processing of the image forming device 210.

FIG. 6 is a flow chart illustrating the flow where a gradation expressed by a unified filled region and one-line image data thereof obtained by conversion processing according to the present embodiment at the side of the host computer 200 is subjected to processing by the image forming device 210 according to the present embodiment.

The data reception process section 211 performs a process at Step S601, the PDL interpretation process section 212 performs processes at Steps S602 to S605, and the display list generating process section 213 performs processes at Steps S606 and S607.

The data reception process section 211 receives the PDL data, and passes it to the PDL interpretation process section 212 (S601).

The PDL interpretation process section 212 interprets the PDL data (S602), extracts rendering positions and rendering widths (S603 and S604), obtains an image size (S605), and passes them to the display list generating process section 213.

The display list generating process section 213 retains a memory for display list generation (DL memory) (S606), and generates a display list (DL) based on the information passed from the PDL interpretation process section 212 (S607).

At this point, processing in the image forming device 210 from the PDL interpretation to the display list generation of an object having one unified filled region and five filling colors is completed.

Thus, since when a gradation is expressed by a unified filled region and one-line image data thereof, one time of command analysis may be sufficient, repeatedly processing is not required, enabling the PDL interpretation processing and the display list generation processing to be performed at a higher rate.

Figure 7:
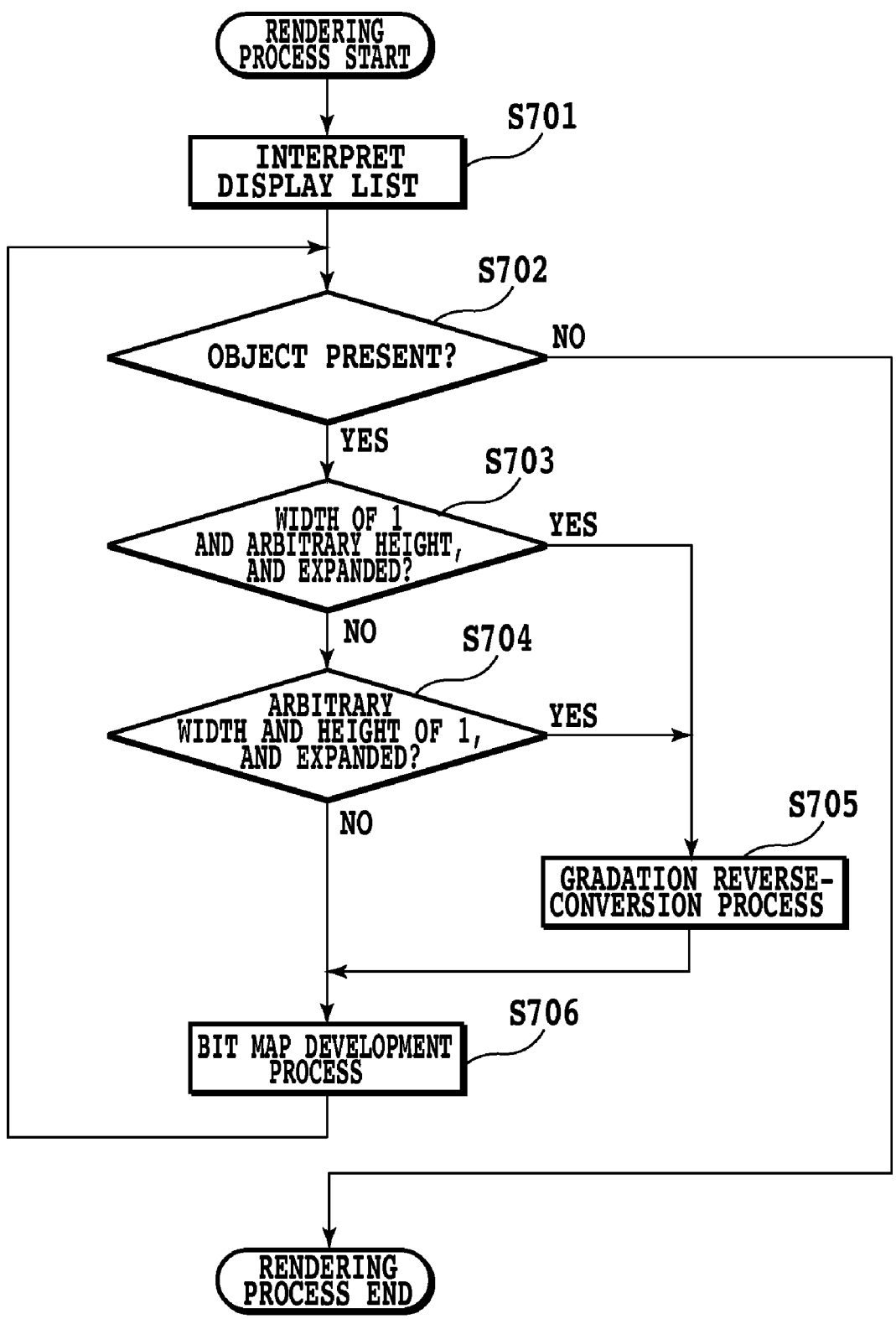
FIG. 7 is a flow chart of the first embodiment, illustrating the detailed flow of a rendering process section.

With reference to a flow chart in FIG. 7, the flow of processing of the rendering process section 220 will be described.

Processes at Steps S701 and S702 are performed by the display list interpretation process section 215, and processes at Steps S703 and S704 are performed by the gradation reverse determination process section 216. A process at Step S705 is performed by the gradation reverse-conversion process section 217, and a process at Step S706 is performed by the bit map formatting process section 218.

The display list interpretation process section 215 interprets the contents of the display list 214, and passes the information of objects included in the display list 214 to the gradation reverse-determination process section 216 (S701). Subsequently, the display list interpretation process section 215, in order to interpret all objects included in the display list 214, determines whether the next object is present (S702).

The gradation reverse-determination process section 216 determines whether the passed object is image data having a width of 1 and an arbitrary height (S703), returns the determination result to the display list interpretation process section 215, and, if the result is affirmative, progresses to gradation reverse-conversion processing at Step S705. If the result is negative, subsequently, the gradation reverse-determination process section 216 determines whether the next object is an image having an arbitrary width and a height of 1 (S704), returns the determination result to the display list interpretation process section 215, and, if the result is affirmative, progresses to Step S705. If the result is negative, the gradation reverse-determination process section 216 progresses to bit map development processing at Step S706.

If determined affirmatively at Step S703 or S704, the object can be determined as image data by which a gradation is to be expressed. Therefore, at Step S705, the display list interpretation process section 215 passes the information of the object to the gradation reverse-conversion process section 217 which performs gradation reverse-conversion processing on the object.

Information of objects other than the object by which a gradation is expressed, which are negatively determined at Step S704, and information of the object subjected to reverse-conversion processing at Step S705 are passed to the bit map formatting process section 218 at Step 706, and an image is formed on the bit map memory 219.

Figure 8:
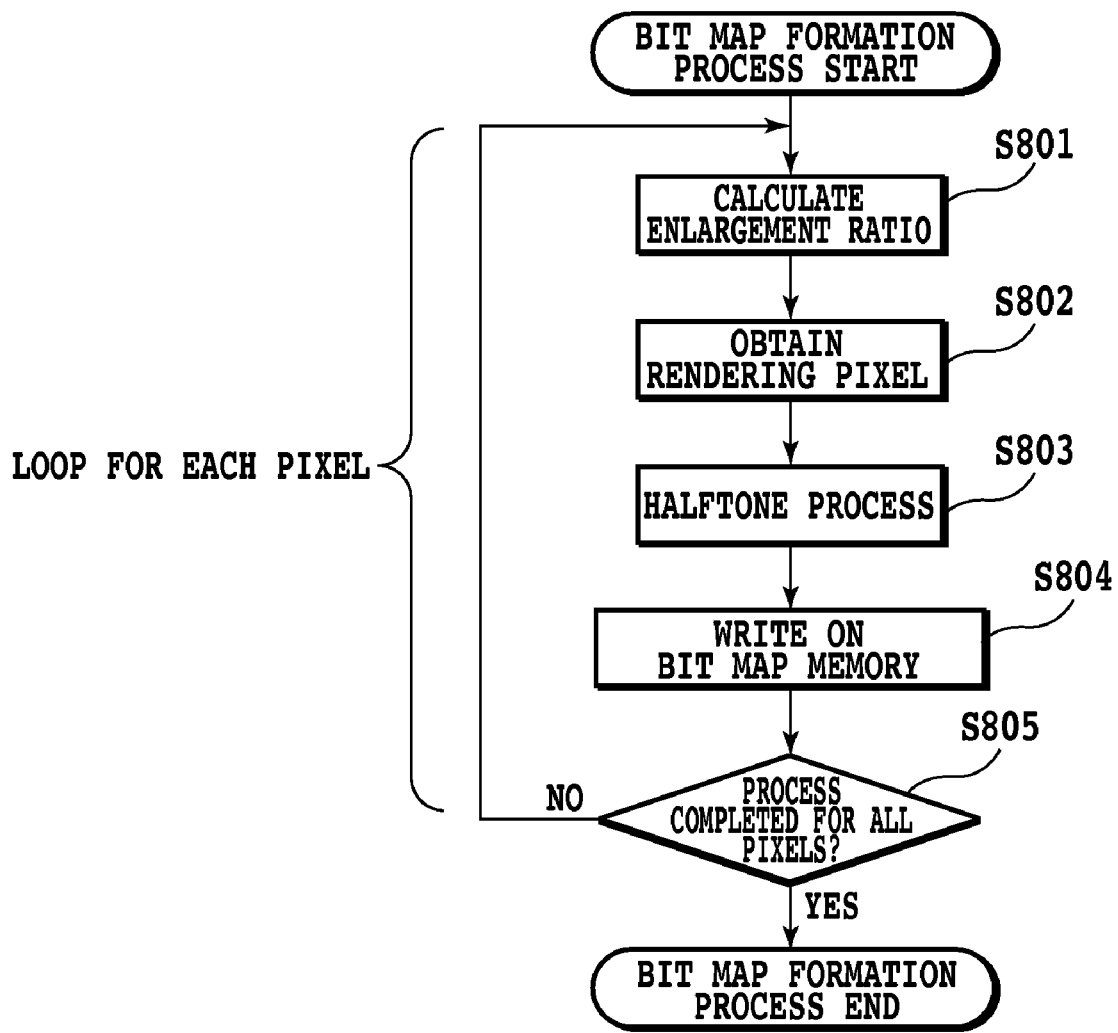
FIG. 8 is a flow chart of the first embodiment, illustrating the detailed flow of a bit map formatting process section, when the gradation expressed by a filled region and one-line image data thereof is subjected to rendering processing.
Figure 9:
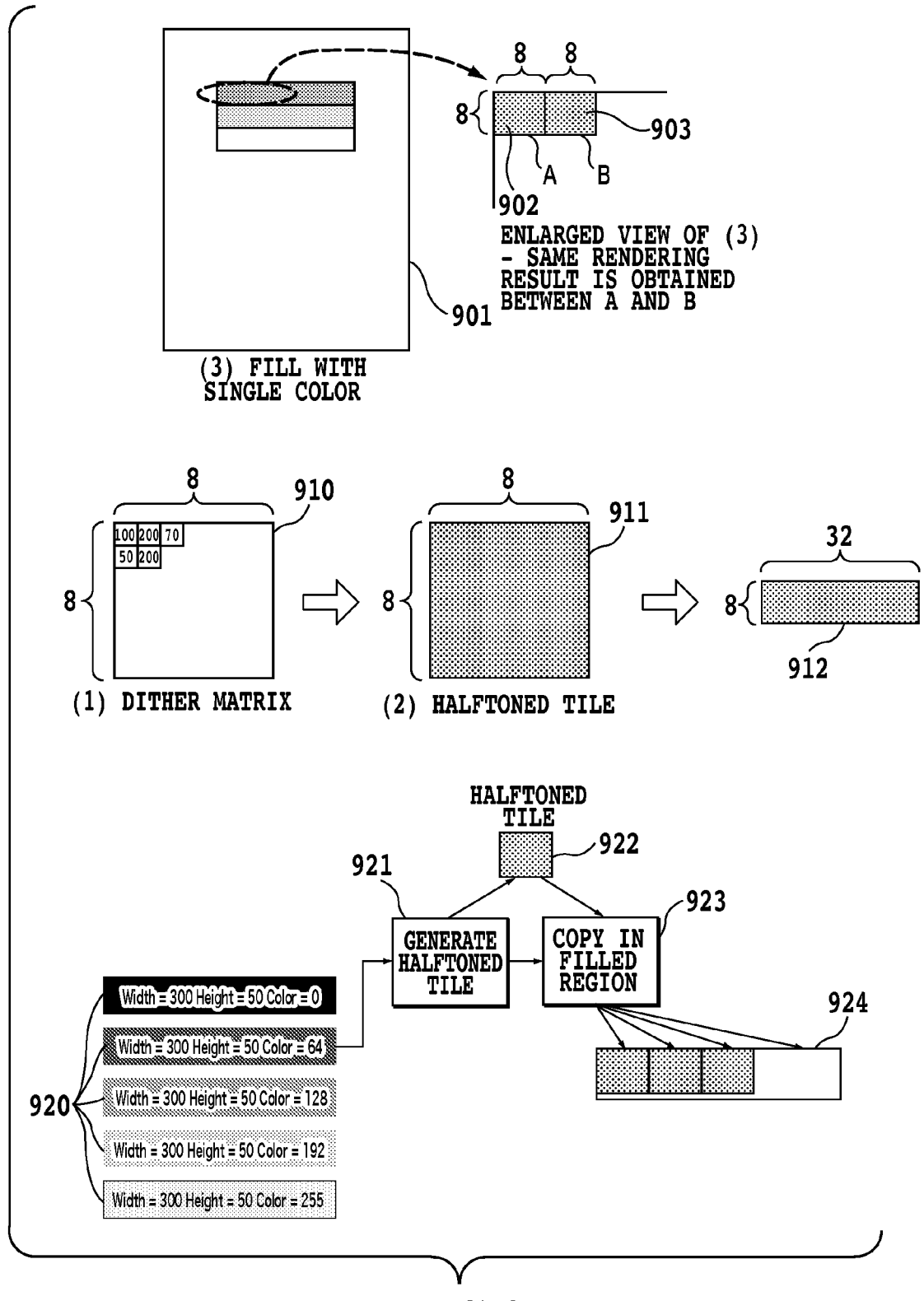
FIG. 9 is a view of the first embodiment, illustrating the outline of processing where a bit map of a gradation expressed by a plurality of filled regions and filling colors thereof is formed at a high rate.
Figure 10:
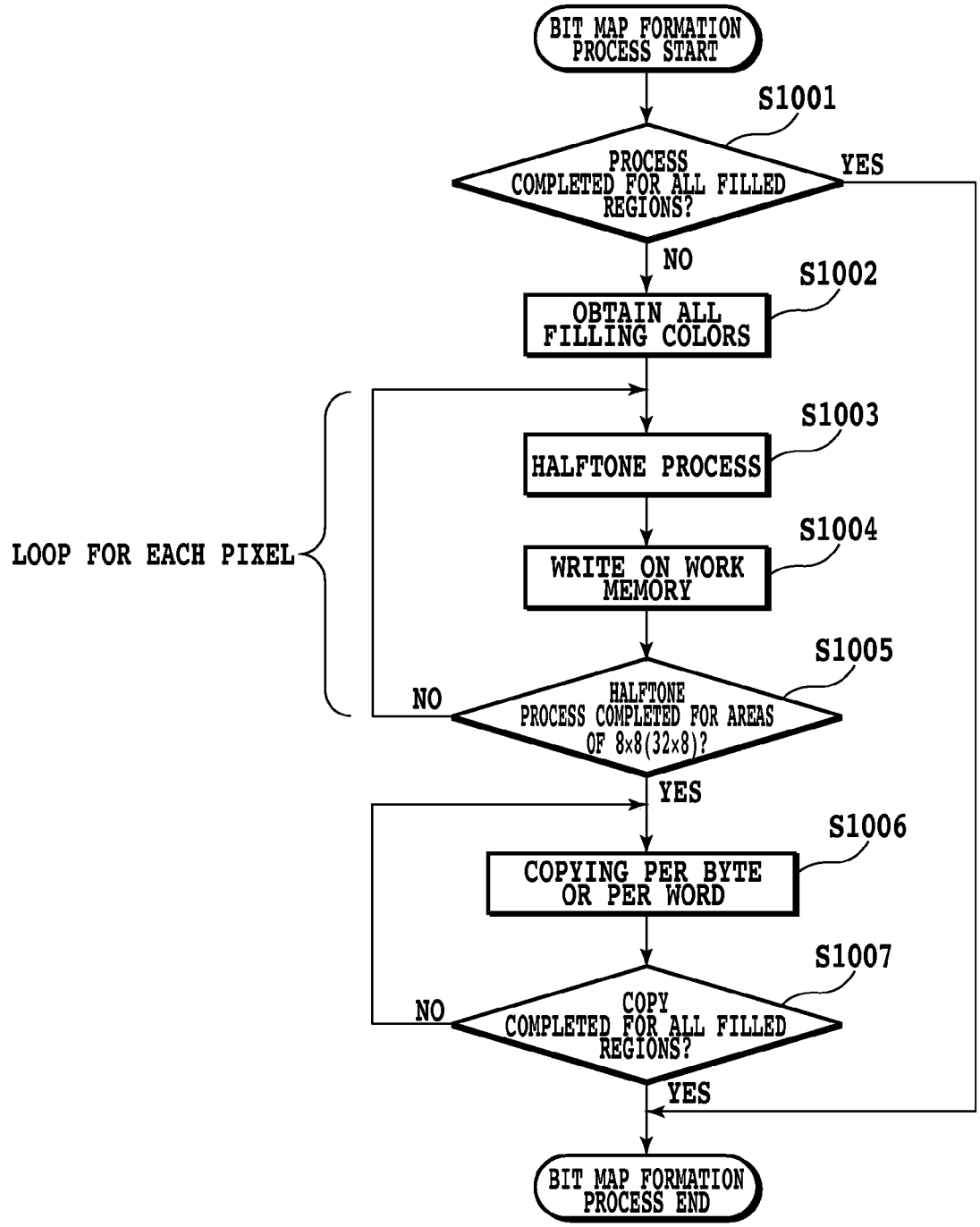
FIG. 10 is a flow chart of the first embodiment, illustrating the detailed flow of processing where a bit map formatting process section forms a bit map of a gradation with a plurality of filled regions and filling colors thereof at a high rate.

With reference to FIGS. 8, 9 and 10, it will be described that, by processing of the present embodiment, where a gradation expressed by a filled region and one-line image data thereof is reversely converted into a gradation expressed by the method for specifying a plurality of filled regions and filling colors thereof, rendering processing can be performed at a higher rate.

FIG. 8 is a flow chart illustrating processing of the bit map formatting process section 218 when a gradation expressed by a filled region and one-line image data thereof is subjected to rendering processing.

The bit map formatting process section 218 receives a filled region and one-line image data thereof, and performs calculation of an enlargement ratio (S801), obtaining a corresponding pixel value (S802), halftone processing (S803), and writing of bit map memory (S804), per pixel (S805).

Here, the calculation of the enlargement ratio at Step S801 can be performed using, for example, affine transformation, based on the specified enlargement ratio received from the host computer 200. The affine transformation is utilized for geometric conversion of an image, such as parallel translation, rotation, and expansion/reduction.

In two-dimensional conversion, if the address of a bit map memory is designated as (X, Y), and the address of one-line image data is designated as (X', Y'), the conversion is expressed by the following matrix conversion formula. (Formula)

If the matrix is developed, calculation of the enlargement ratio can be performed based on the following conversion formulas:

$$X'=aX+bY+e$$

$$Y'=cX+dY+f.$$

In the calculation of the enlargement ratio (S801), operations of above formulas are performed for each pixel. If expansion is performed only horizontally and vertically, the conversion formulas can also be simplified as follows:

$$X'=aX$$

$$Y'=dY.$$

Thus, since, if expansion processing and halftone processing are directly performed on image data without any processing, it is necessary to repeat Steps S801 to S805 per pixel so that the processing is performed for all pixels, it will take a very long time for bit map formation.

FIG. 9 is a view illustrating the outline of processing according to the present embodiment, where the bit map formatting process section 218 performs bit map formation of a gradation with a plurality of filled regions and filling colors thereof at a high rate.

When processing is performed using a halftone dither matrix 910 having a height of 8 and a width of 8, for a portion 901 specified by filled regions and a filling color, the same rendering result is repeated every rectangular area of 8×8 as indicated by reference numerals 902 and 903.

Therefore, by subjecting one 8×8 rectangular area 911 to dither processing to generate halftoned tile data, and then repeatedly copying the data on a page, the processing can be performed at a high rate.

If the width and the height of an image formed on a bit map memory is defined by W and H, respectively, when rectangular tile data having a constant size of 8×8 is copied in a plurality of times, the number of copying times is given by the following formula:

$$\text{Number of copying times}=(W/8)\times H.$$

Further, although, for the rectangular tile data having a constant size of 8×8, copying is performed everybyte, if tile data 912 having a constant size of 32×8 is generated, copying can be performed every word, enabling processing to be performed at a still higher rate.

Each object 920 made up of a plurality of filled regions and filling colors thereof is subjected to bit map formation processing according to the following processing procedures.

The bit map formatting process section 218,
(1) in processing 921, generates halftoned tiles 922 of areas of 8×8 (or 32×8) (rectangular areas 902 and 903) corresponding to filling colors; and
(2) in processing 923, simply copies the halftoned tiles 922 generated in (1) on the whole of filled regions (924).

By performing the above-mentioned processing 921 and 923, an image having the gradation expressed by the method for specifying a plurality of filled regions and filling colors thereof is formed on the bit map memory 219.

In the processing of the present invention, by performing processing for each pixel, such as calculation of an enlargement ratio, obtaining a corresponding pixel value and halftone processing, only for the areas of 8×8 (or 32×8), tiles having a constant size are formed. After forming the halftoned tiles, by copying them every byte (if one pixel has one bit, 8 pixels are simultaneously processed) or every word (if one pixel has one bit, 32 pixels are simultaneously processed), the bit map formatting process section 218 can perform bit map formation processing at a high rate.

FIG. 10 is a flow chart illustrating the details of processing by the bit map formatting process section 218 described in FIG. 9.

First, in order to perform processing on a plurality of filled regions, whether processing has been completed for all the filled regions is determined (S1001) If the processing has been completed for all the filled regions, the processing will be ended.

If the processing has not been completed for all the filled regions, the bit map formatting process section 218 progresses to Step S1002, and obtains all the filling colors. Subsequently, the bit map formatting process section 218 performs halftone processing only for constant size (8×8 or 32×8) areas of a halftone matrix, and writes the processed data on a work memory to generate halftoned tile data (S1003 to S1005). In this loop, halftone processing requiring a long time is performed only for the areas of 8×8 (or 32×8).

Loops of subsequent Steps S1006 and S1007 are simple repeated processing, thereby, the processing can be performed at a high rate. That is, the bit map formatting process section 218 copies the generated halftoned tiles every byte or every word, to apply them to the filled regions, and determines whether copying has been completed to all the plurality of filled regions (S1006, S1007).

Second Embodiment

The present invention is also applicable when gradation conversion and gradation reverse-conversion are performed by one device.

Figure 11:
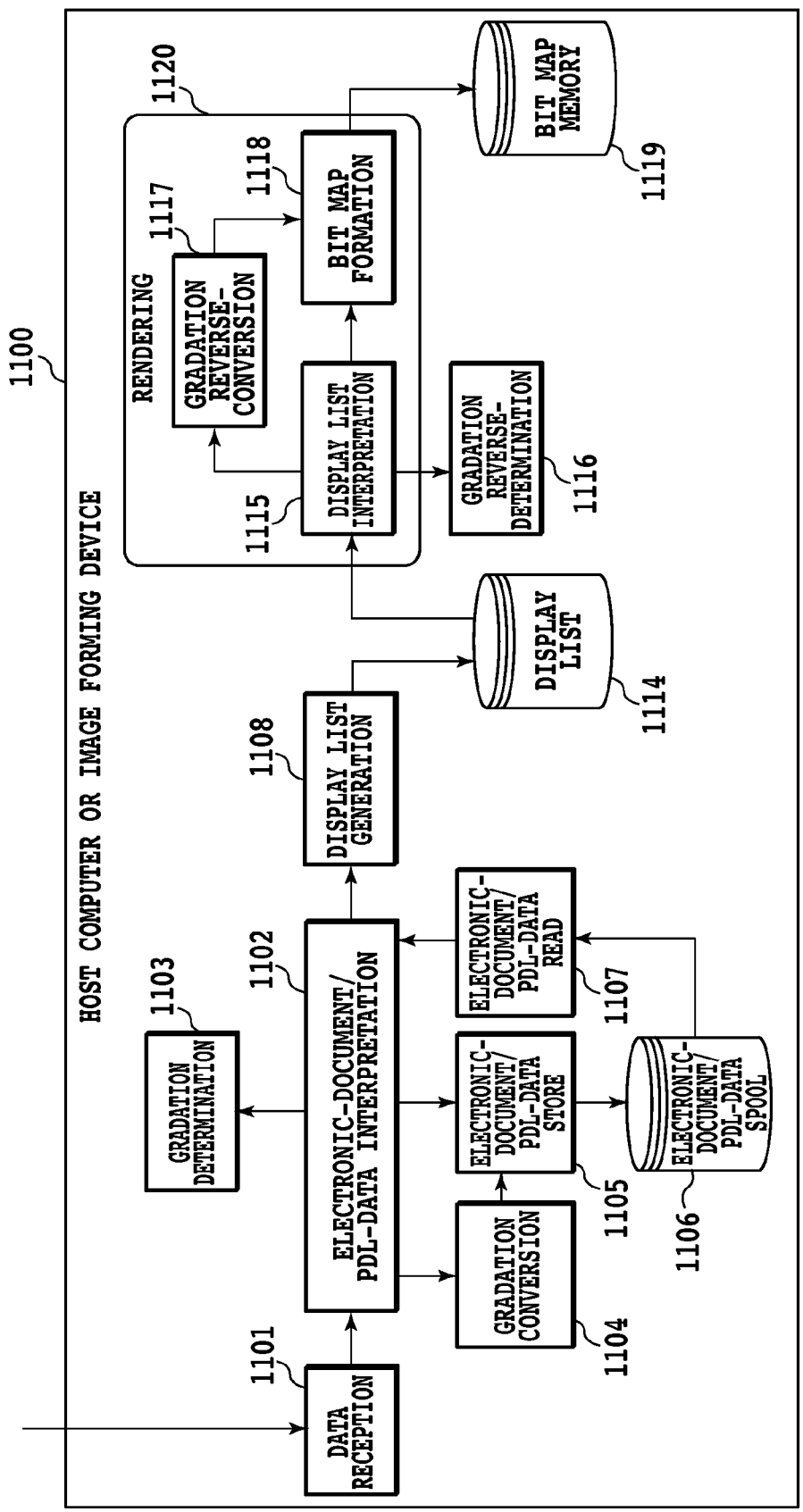
FIG. 11 is a block diagram of a second embodiment, illustrating a flow of whole processing.

With reference to FIG. 11, the present embodiment will be described, where gradation conversion and gradation reverse-conversion are performed as mentioned above.

When a host computer or an image forming device 1100 deals electronic documents and PDL data repeatedly, in some times, temporary storing may be performed.

When performing temporary storing, as the sizes of the electronic documents and the PDL data are smaller, more efficient saving can be performed.

The data received by a data reception process section 1101 is interpreted by an electronic document or PDL interpretation process section 1102.

The interpretation result is passed to a gradation determination process section 1103, where whether the gradation of the received data is expressed by a plurality of filled regions and filling colors thereof is determined.

The data where a gradation is expressed by a plurality of filled regions and filling colors thereof is converted into data of filled region and one-line image thereof in a gradation conversion process section 1104.

The converted data is passed to an electronic document or PDL data storing section 1105, and stored in an electronic document or PDL data spool 1106.

When reprinting is designated by a user, the electronic document or PDL interpretation process section 1102 obtains an electronic document or PDL data in the electronic document or PDL data spool 1106 through an electronic document or PDL data reading process section 1107.

The electronic document or PDL interpretation process section 1102 interprets the obtained electronic document or PDL data, and passes the interpretation result to a display list generating process section 1108.

Subsequently, rendering processing including gradation reverse-conversion processing is performed similar to the first embodiment.

Third Embodiment

The present embodiment utilizes a method where by specifying a plurality of address points and the colors of the address points and calculating the pixel colors between the address points from the address points and the colors of the address points, a gradation is rendered. By applying the above-mentioned method for a gradation instead of the gradation expression method for specifying a plurality of filled regions and filling colors thereof, the present embodiment can be performed.

In the present embodiment, an image is formed by converting a gradation data into data of a filled region and a one-line image thereof, and at the time of image formation processing, by converting a gradation expressed by the data of a filled region and a one-line image thereof into data of a plurality of filled regions and filling colors thereof.

In addition, the present invention may be applied to a system including a plurality of apparatuses (such as, for example, a host computer, an interface device, a reader, and a printer), or to a device including one apparatus (such as, for example, a copying machine or a facsimile machine).

Moreover, a recording medium recording a program code of software for realizing the function of the above-mentioned embodiment is supplied to a system or a device, and a computer (a CPU or an MPU) of the system or the device reads out the program code recorded on the recording medium and executes the program code. It is obvious that the object of the present invention can also be achieved by the procedure.

In this case, the program code itself read out from the recording medium realizes the function of the above-mentioned embodiment, and the recording medium storing the program code constitutes the present invention.

As a recording medium for supplying the program code, for example, a floppy disk (registered trademark), a hard disk, an optical disk, a magneto-optical disk, a CD-ROM, a CD-R, a magnetic tape, a nonvolatile memory card, a ROM, and the like can be used.

Moreover, it is obvious that by executing the program code read out by the computer, not only the above-mentioned function of the embodiment is realized, but also the following case is included. That is the case where, based on the indication of the program code, an OS (operating system) or the like operating on the computer executes a part or the whole of practical processing, and, by the processing, the above-mentioned function of the embodiment is realized.

Further, it is obvious that a case is also included, where the program code read from the recording medium is written on a memory provided to a function expansion board inserted in the computer or a function expansion unit connected to the computer, then, based on the indication of the program code a CPU or the like provided to the function expansion board or the function expansion unit, a part or the whole of practical processing is performed, and by the processing, the above-mentioned function of the embodiment is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-275477, filed Oct. 23, 2007, which is hereby incorporated by reference herein in its entirety.

What is claimed is:

1. An image forming system comprising a host device and an image forming device which receives image data from said host device to form an image,
    wherein said host device includes:
    conversion means for converting a gradation which is made up of a plurality of filled regions having different filling colors into one-line image data comprising reduced versions respectively of the filled regions; and
    transmission means for transmitting the one-line image data to said image forming device; and
    wherein said image forming device includes:
    rendering means;
    receiving means for receiving the one-line image data from said host device; and
    interpreting means for interpreting the received image data, generating data that can be interpreted by said rendering means, and saving the data,
    wherein said rendering means converts the saved data into the gradation made up of the plurality of filled regions having different filling colors.

2. The image forming system according to claim 1, wherein said rendering means comprises:
    means for generating rectangular tile data having a constant size for each of the plurality of filled regions, subjecting each pixel in the rectangular tile data to a halftone process according to the corresponding filling color; and
    means for applying the generated tile data to each of the plurality of filled regions.

3. An image forming method in an image forming system having a host device and an image forming device that receives image data from the host device to form an image, the method comprising the steps of,
    in the host device:
    converting a gradation which is made up of a plurality of filled regions having different filling colors into one-line image data comprising reduced versions respectively of the filled regions; and
    transmitting the one-line image data to the image forming device; and
    in the image forming device:
    rendering the gradation;
    receiving the one-line image data transmitted from the host device in said transmitting step; and
    interpreting the received image data, generating data that can be interpreted in said rendering step, and saving the data,
    wherein said rendering step includes converting the saved data into the gradation made up of the plurality of filled regions having different filling colors.

4. The image forming method according to claim 3, wherein said rendering step includes:
    generating rectangular tile data having a constant size for each of the plurality of fill regions, subjecting each pixel in the rectangular tile data to a halftone process according to the corresponding filling color; and
    applying the generated tile data to each of the plurality of filled regions.

5. A host device comprising:
    conversion means for converting a gradation which is made up of a plurality of filled regions having different filling colors into one-line image data comprising reduced versions respectively of the filled regions; and transmission means for transmitting the image data to an image forming device.

6. An image forming device comprising:
rendering means;
means for receiving one-line image data obtained by converting a gradation which is made up of a plurality of filled regions having different filling colors into one-line image data comprising reduced versions respectively of the filled regions; and
means for interpreting the received image data, generating data that can be interpreted by said rendering means, and saving the data,
wherein said rendering means converts the saved data into the gradation made up of the plurality of filled regions having different filling colors.

7. The image forming device according to claim 6, wherein said rendering means comprises:
means for generating rectangular tile data having a constant size for each of the plurality of fill regions, subjecting each pixel in the rectangular tile data to a halftone process according to the corresponding filling color; and
means for applying the generated tile data to each of the plurality of filled regions.

8. A non-transitory, computer-readable storage medium storing instructions capable of being read by a processing device, the instructions causing the processing device to function as:
rendering means;
means for receiving one-line image data obtained by converting a gradation which is made up of a plurality of filled regions having different filling colors into one-line image data comprising reduced versions respectively of the filled regions; and
means for interpreting the received image data, generating data that can be interpreted by said rendering means, and saving the data,
wherein said rendering means converts the saved data into the gradation made up of the plurality of filled regions having different filling colors.

* * * * *